United States Patent
Duong et al.

(10) Patent No.: US 11,462,208 B2
(45) Date of Patent: Oct. 4, 2022

(54) IMPLEMENTING A CORRECTION MODEL TO REDUCE PROPAGATION OF AUTOMATIC SPEECH RECOGNITION ERRORS

(71) Applicant: Oracle International Corporation, Redwood Shores, CA (US)

(72) Inventors: Thanh Long Duong, Seabrook (AU); Mark Edward Johnson, Castle Cove (AU)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 83 days.

(21) Appl. No.: 16/992,291

(22) Filed: Aug. 13, 2020

(65) Prior Publication Data
US 2021/0074262 A1 Mar. 11, 2021

Related U.S. Application Data

(60) Provisional application No. 62/898,677, filed on Sep. 11, 2019.

(51) Int. Cl.
*G10L 15/01* (2013.01)
*G10L 15/16* (2006.01)
*G10L 15/22* (2006.01)

(52) U.S. Cl.
CPC .............. *G10L 15/01* (2013.01); *G10L 15/16* (2013.01); *G10L 15/22* (2013.01)

(58) Field of Classification Search
CPC .......... G10L 15/01; G10L 15/16; G10L 15/22
USPC .................................................. 704/232
See application file for complete search history.

(56) References Cited

U.S. PATENT DOCUMENTS

| | | | |
|---|---|---|---|
| 2017/0323636 A1* | 11/2017 | Xiao | G06F 16/332 |
| 2018/0121415 A1* | 5/2018 | Perez | G06F 16/367 |
| 2019/0130904 A1* | 5/2019 | Homma | G10L 15/18 |

OTHER PUBLICATIONS

Joint Domain, intent slot prediction for spoken language understanding, ASRU, 2017, IEEE; Young-Bum Kim (Year: 2017).*
Joint Domain, intent slot prediction for spoken language understanding, ASRU, 2017, IEEE; Young-Bum Kim (Year: 2017 (Year: 2017).*

(Continued)

*Primary Examiner* — Bharatkumar S Shah
(74) *Attorney, Agent, or Firm* — Kilpatrick Townsend & Stockton LLP

(57) ABSTRACT

Some techniques described herein determine a correction model for a dialog system, such that the correction model corrects output from an automatic speech recognition (ASR) subsystem in the dialog system. A method described herein includes accessing training data. A first tuple of the training data includes an utterance, where the utterance is a textual representation of speech. The method further includes using an ASR subsystem of a dialog system to convert the utterance to an output utterance. The method further includes storing the output utterance in corrective training data that is based on the training data. The method further includes training a correction model based on the corrective training data, such that the correction model is configured to correct output from the ASR subsystem during operation of the dialog system.

20 Claims, 11 Drawing Sheets

(56) References Cited

OTHER PUBLICATIONS

Y. Chen, R. Price and S. Bangalore, "Spoken Language Understanding without Speech Recognition," 2018 IEEE International Conference on Acoustics, Speech and Signal Processing (ICASSP), 2018, pp. 6189-6193, doi: 10.1109/ICASSP.2018.8461718. (Year: 2018).*

* cited by examiner

IMPLEMENTING A CORRECTION MODEL TO REDUCE PROPAGATION OF AUTOMATIC SPEECH RECOGNITION ERRORS

CROSS-REFERENCE TO RELATED APPLICATIONS

The present disclosure claims priority to U.S. Provisional Application Ser. No. 62/898,677 for "Implementing a Corrective Model to Reduce Propagation of Automatic Speech Recognition Errors," filed Sep. 11, 2019, which is incorporated by reference herein in its entirety.

TECHNICAL FIELD

The present disclosure relates to dialog systems and, more particularly, to techniques for implementing a correction model to correct output from automatic speech recognition in a dialog system and to thereby reduce the propagation of errors made during automatic speech recognition in the dialog system.

BACKGROUND

An increasing number of devices now enable users to interact with the devices directly using voice or spoken speech. For example, a user can speak to such a device in a natural language, and in doing so, the user can ask a question or make a statement requesting an action to be performed. In response, the device performs the requested action or responds to the user's question using audio output. Since interacting directly using voice is a more natural and intuitive way for humans to communicate with their surroundings, the popularity of such speech-based systems is growing at an astronomical rate.

BRIEF SUMMARY

The present disclosure relates to techniques for implementing a correction model to reduce the propagation of errors made during automatic speech recognition in a dialog system. The correction model may operate in the workflow between an automatic speech recognition (ASR) subsystem and a semantic parser subsystem to reduce errors output by the ASR subsystem and thus received by the semantic parser subsystem, or the correction model may be integrated into the semantic parser subsystem to enable the semantic parser subsystem to map erroneous ASR subsystem output to an appropriate logical form.

In some embodiments, a correction system trains a correction model, which may but need not be integrated with a corrective semantic parser. To this end, the correction system may access training data intended for training the semantic parser subsystem, where the training data may include tuples, each tuple including an original utterance and a logical form representing that original utterance. For each such tuple, the correction system may generate a set of speeches, where each speech is an audio file or portion of an audio file, and where the set of speeches represent variations in how the original utterance can be spoken. For each such speech, the correction system may apply an ASR subsystem to determine an output utterance, resulting in a set of output utterances corresponding to the set of speeches representing the original utterance. In some embodiments, the ASR subsystem is the same ASR subsystem used during regular operation of the dialog system.

In some embodiments, the correction system trains a correction model with corrective tuples, each corrective tuple including an output utterance and the corresponding original utterance. As such, the correction model may be trained to map an utterance output by the ASR subsystem to a corrected utterance. In another embodiment, the correction system trains a corrective semantic parser with corrective tuples, each including an output utterance and the logical form of the corresponding original utterance. As such, the corrective semantic parser may be trained to map an utterance output by the ASR subsystem to the logical form of a corrected utterance; thus, a correction model is in effect integrated into the semantic parser.

In some embodiments, during operation of the dialog system, output from the ASR subsystem is corrected by the correction model prior to being input to the semantic parser subsystem, or the corrective semantic parser implicitly corrects such errors in determining a logical form. Thus, errors in output from the ASR subsystem are reduced and are therefore not propagated throughout the dialog system.

The foregoing, together with other features and embodiments will become more apparent upon referring to the following specification, claims, and accompanying drawings.

DETAILED DESCRIPTION

Figure 1:
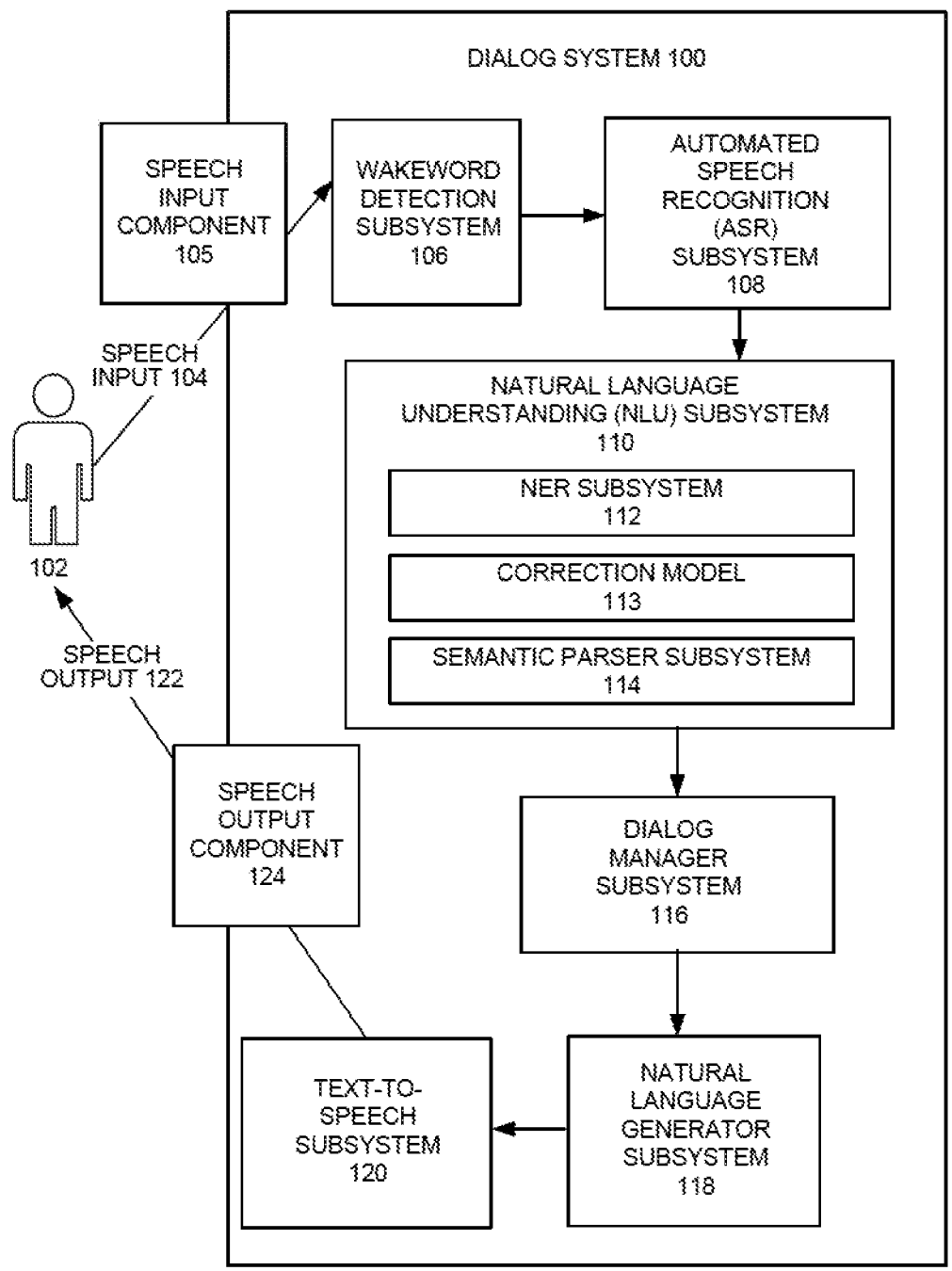
FIG. 1 is a diagram of an example of a dialog system incorporating a correction model to reduce the propagation of errors resulting from automatic speech recognition in the dialog system, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

A voice-enabled system that is capable of having a dialog with a user via speech inputs and audio outputs, also referred to as speech or voice outputs, can come in various forms. For example, such a system may be provided as a stand-alone device, as a digital or virtual assistant, as a voice-capable service, or the like. In each of these forms, the system is capable of receiving speech inputs, understanding the speech inputs, generating responses or taking actions responsive to the speech inputs, and outputting the responses using audio outputs. In certain embodiments, the dialog functionality in such a voice-enabled system is provided by a dialog system or infrastructure ("dialog system"). The dialog system is configured to receive speech inputs, interpret the speech inputs, maintain a dialog, possibly perform or cause one or more actions to be performed based on interpretations of the speech inputs, prepare appropriate responses, and output the responses to the user using audio output.

Conventionally, a dialog system includes various machine learning (ML) models (i.e., prediction models). The ML models of a dialog system, such as the an automatic speech recognition (ASR) subsystem, a semantic parser subsystem, and a text-to-speech (TTS) subsystem are trained with clean data (i.e., data that is not the output of a component of the dialog system). As a result, these ML models typically learn to handle clean data, rather than data that has already been processed and likely has errors that have been introduced. For instance, the dialog system receives speech input from a user. If the ASR subsystem, also referred to as the ASR, makes an error in translating that speech input to an utterance, then that error is passed along to the semantic parser subsystem in the form of an inaccurate utterance output by the ASR subsystem. The semantic parser subsystem, also referred to as the semantic parser, then produces a logical form based on the inaccurate utterance. That logical form is processed by a dialog manager subsystem, which attempts to respond to the original speech input as expressed by the logical form. However, because of errors propagated throughout the dialog system, the logical form may not accurately represent the speech input, and thus, the dialog manager subsystem may be ineffective at facilitating a dialog with the user or performing tasks request by the user as part of the dialog.

Embodiments described herein provide improved techniques for correcting ASR output (i.e., output from the ASR) in the form of a correction model, placed between the ASR and the semantic parser in the pipeline of the dialog system, or in the form of a corrective semantic parser that has been trained on likely errors made by the ASR. To this end, a correction system as described herein may train a correction model or may train a corrective semantic parser incorporating a correction model.

Conventionally, a semantic parser is trained with a set of tuples, each tuple including an utterance (i.e., a textual representation of a unit of speech) and a logical form (i.e., a syntactic expression of the utterance or other representation of speech according to an established grammar). That training enables the semantic parser to map an input utterance to a corresponding logical form. According to some embodiments, an example of the correction system accesses a set of tuples typically used to train the semantic parser, where each such tuple includes an utterance and a logical form. The correction system converts each utterance into a set of speeches, each speech of which may be an audio file or portion of an audio file. Each set of speeches corresponding to an utterance is a variation of audio of the utterance as spoken. For instance, the set of speech files may include both male and female voices as well as various accents and dialects. Thus, the set of speeches includes various audio each representing the utterance spoken by a different voice. The correction system utilizes each speech in the set of speeches as input into the ASR, which, in some embodiments, is the same ASR used during the workflow of the dialog system, causing the ASR to output an utterance for each speech file. Thus, each original utterance has been converted into a set of utterances output by the ASR.

In certain embodiments, each such utterance output by the ASR is joined in a tuple with the original utterance and used to train a correction model. As such, in the workflow (i.e., the pipeline) of the dialog system, the correction model sits between the ASR and the semantic parser to effectively correct the ASR output. Additionally or alternatively, in certain embodiments, each such utterance output by the ASR corresponding to the original utterance is joined in a tuple with the logical form of the original utterance, and the correction system uses such tuples to train a corrective semantic parser. As such, the corrective semantic parser is implicitly configured to handle errors in the ASR output.

FIG. 1 is a diagram of an example of a dialog system 100 incorporating a correction model 113 to reduce the propagation of errors resulting from automatic speech recognition in the dialog system 100, according to certain embodiments. The dialog system 100 is configured to receive speech inputs 104, also referred to as voice inputs, from a user 102. The dialog system 100 may then interpret the speech inputs 104. The dialog system 100 may maintain a dialog with a user 102 and may possibly perform or cause one or more actions to be performed based upon interpretations of the speech inputs 104. The dialog system 100 may prepare appropriate responses and may output the responses to the user using voice or speech output, also referred to as audio output. The dialog system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In certain embodiments, the processing performed by the dialog system 100 is implemented by a pipeline of components or subsystems, including a speech input component 105; a wake-word detection (WD) subsystem 106; an ASR subsystem 108; a natural language understanding (NLU) subsystem 110, which includes a named entity recognizer (NER) subsystem 112 and a semantic parser subsystem 114; a dialog manager (DM) subsystem 116; a natural language generator (NLG) subsystem 118; a TTS subsystem 120; and a speech output component 124. The subsystems listed above may be implemented only in software (e.g., using code, a program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input 104 to the wake-word detection subsystem 106.

The wake-word detection (WD) subsystem 106 is configured to listen for and monitor a stream of audio input for input corresponding to a special sound or word or set of words, referred to as a wake-word. Upon detecting the wake-word for the dialog system 100, the WD subsystem 106 is configured to activate the ASR subsystem 108. In certain implementations, a user may be provided the ability to activate or deactivate the WD subsystem 106 (e.g., by pushing a button) to cause the WD subsystem 106 to listen for or stop listening for the wake-word. When activated, or when operating in active mode, the WD subsystem 106 is configured to continuously receive an audio input stream and process the audio input stream to identify audio input, such as speech input 104, corresponding to the wake-word. When audio input corresponding to the wake-word is detected, the WD subsystem 106 activates the ASR subsystem 108.

As described above, the WD subsystem 106 activates the ASR subsystem 108. In some implementations of the dialog system 100, mechanisms other than wake-word detection may be used to trigger or activate the ASR subsystem 108. For example, in some implementations, a push button on a device may be used to trigger the ASR subsystem 108 without needing a wake-word. In such implementations, the WD subsystem 106 need not be provided. When the push button is pressed or activated, the speech input 104 received after the button activation is provided to the ASR subsystem 108 for processing. Additionally or alternatively, in some implementations, the ASR subsystem 108 may be activated upon receiving an input to be processed.

The ASR subsystem 108 is configured to receive and monitor speech input 104 after a trigger or wake-up signal (e.g., a wake-up signal may be sent by the WD subsystem 106 upon the detection of the wake-word in the speech input 104, or the wake-up signal may be received upon the activation of a button) and to convert the speech input 104 to text. As part of its processing, the ASR subsystem 108 performs speech-to-text conversion. The speech input 104 may be in a natural language form, and the ASR subsystem 108 is configured to generate the corresponding natural language text in the language of the speech input 104. This corresponding natural language text is referred to herein as an utterance. For instance, the speech input 104 received by the ASR subsystem 108 may include one or more words, phrases, clauses, sentences, questions, or the like. The ASR subsystem 108 is configured to generate an utterance for each spoken clause and feed the utterances to the NLU subsystem 110 for further processing.

The NLU subsystem 110 receives utterances generated by the ASR subsystem 108. The utterances received by the NLU subsystem 110 from the ASR subsystem 108 may include text utterances corresponding to spoken words, phrases, clauses, or the like. The NLU subsystem 110 translates each utterance, or a series of utterances, to a corresponding logical form.

In certain implementations, the NLU subsystem 110 includes a named entity recognizer (NER) subsystem 112 and a semantic parser subsystem 114. The NER subsystem 112 receives an utterance as input, identifies named entities in the utterance, and tags the utterance with information related to the identified named entities. The tagged utterances are then fed to the semantic parser subsystem 114, which is configured to generate a logical form for each tagged utterance, or for a series of tagged utterances. The logical form generated for an utterance may identify one or more intents corresponding to the utterance. An intent for an utterance identifies an objective of the utterance. Examples of intents include "order pizza" and "find directions." An intent may, for example, identify an action that is requested to be performed. In addition to intents, a logical form generated for an utterance may also identify slots, also referred to as parameters or arguments, for an identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem 110 may use machine learning based techniques, rules, which may be domain specific, or a combination of machine learning techniques and rules to generate the logical forms. The logical forms generated by the NLU subsystem 110 are then fed to the DM subsystem 116 for further processing.

In some embodiments described herein, the NLU subsystem 110 also includes a correction model 113. As described in detail below, the correction model 113 may process data between the ASR subsystem 108 and the semantic parser subsystem 114 or may be integrated with the semantic parser subsystem 114. The correction model 113 may be an ML model and may learn errors typically made in this specific ASR subsystem 108 of the dialog system 100. As such, the correction model 113 may correct those errors to prevent such errors from being passed forward in the logical form.

The DM subsystem 116 is configured to manage a dialog with the user based on logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, or other actions. For example, the DM subsystem 116 is configured to interpret the intents identified in the logical forms received from the NLU subsystem 110. Based on the interpretations, the DM subsystem 116 may initiate one or more actions that it interprets as being requested by the speech inputs 104 provided by the user. In certain embodiments, the DM subsystem 116 performs dialog-state tracking based on current and past speech inputs 104 and based on a set of rules (e.g., dialog policies) configured for the DM subsystem 116. These rules may specify the different dialog states, conditions for transitions between states, actions to be performed when in a particular state, or the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output as audio to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and to respond using speech outputs 122 and, thereby, to maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

Figure 2:
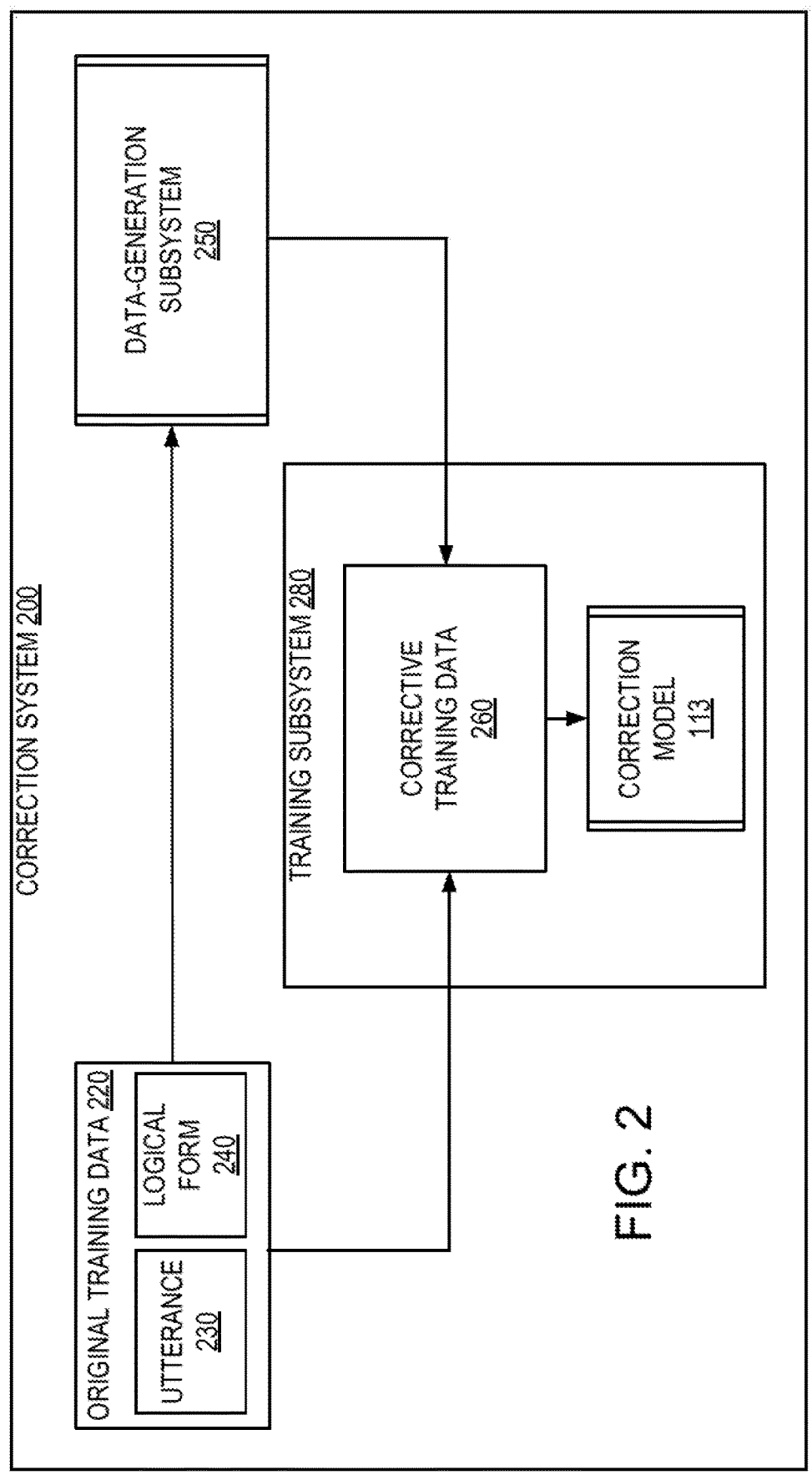
FIG. 2 is a diagram of an example of a correction system configured to train the correction model for inclusion in a dialog system, according to certain embodiments.

FIG. 2 is a diagram of an example of a correction system 200 configured to train a correction model 113 for inclusion in a dialog system, according to some embodiments described herein. For instance, the correction model 113 may be utilized as part of the pipeline of the dialog system, as described in detail below. In some embodiments, the correction system 200 is implemented as a computing device or portion thereof, such as a server. The correction system 200 may be implemented as a specialized hardware device or as program code, or a combination of both. For instance, the operations described herein as being performed by the correction system 200 may be embodied in program code implementing the correction system 200, where such program code is executable by one or more processing units.

As shown in FIG. 2, the correction system 200 accesses a set of original training data 220 including a set of original tuples, where each such original tuple may include an utterance 230 and a corresponding logical form 240. Various techniques exist for obtaining this original training data 220, and one or more of such techniques may be used by the correction system 200. Similar tuples, each including an utterance and a logical form, are typically appropriate for training a semantic parser, and thus, the original training data 220 may be used, or useable, to train a semantic parser to map an utterance to a logical form in the dialog system in addition to the use of the original training data 220 as described herein. For instance, the original training data 220 may be used to train a semantic parser to be used in the same dialog system in which the correction model 113 will be used.

In some embodiments, the correction system 200 utilizes a data-generation subsystem 250, which converts the original training data 220 into corrective training data 260. For instance, for each original tuple in the original training data 220, the data-generation subsystem 250 converts the original tuple to one or more corrective tuples useable for training a correction model 113. The data-generation subsystem 250 may be implemented only in software (e.g., using code, program, or instructions executable by one or more processors or cores), in hardware, or in a combination of hardware and software.

Additionally, in some embodiments, a training subsystem 280 of the correction system 200 trains the correction model 113 to correct output from the ASR. Specifically, for instance, embodiments of the training subsystem 280 train the correction model 113 to predict corrected ASR output based on actual ASR output or to predict logical forms based on implicitly corrected ASR output. The training subsystem 280 may be implemented only in software (e.g., using code, program, or instructions executable by one or more processors or cores), in hardware, or in a combination of hardware and software.

In certain embodiments, the resulting correction model 113 sits between an ASR and a semantic parser subsystem, also referred to as a semantic parser, during operation of the dialog system. In particular, the correction model 113 maps output from the ASR to input to the semantic parser, or the correction model 113 is integrated with the semantic parser to implicitly correct ASR output when determining a logical form. More generally, some embodiments of the correction model 113 correct errors in ASR output to prevent such errors from propagating throughout the dialog system.

Figure 3:
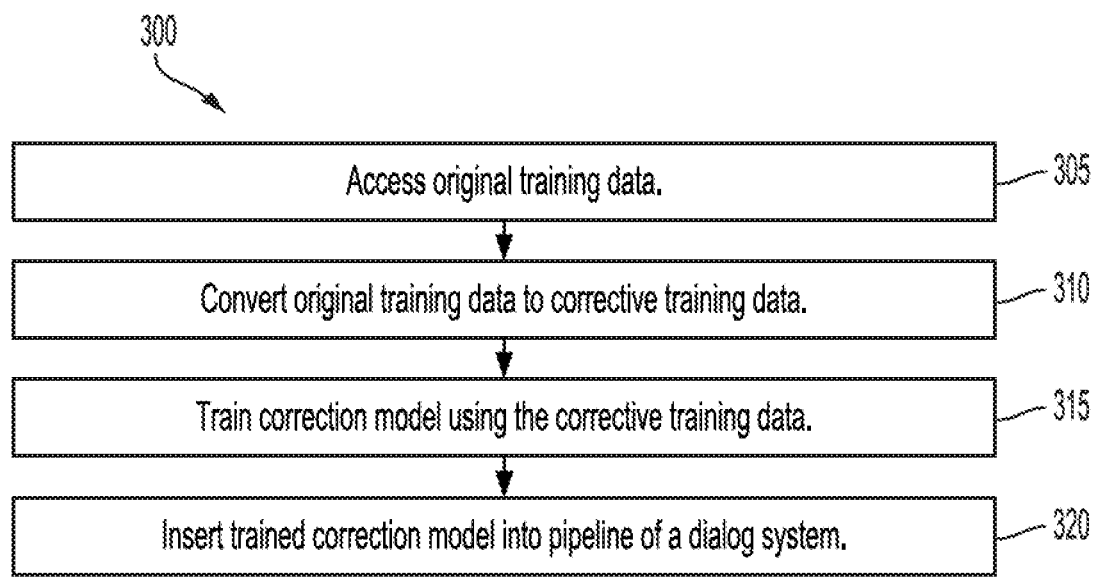
FIG. 3 is a diagram of a method of incorporating the correction model into the dialog system, according to certain embodiment.

FIG. 3 is a diagram of a method 300 of incorporating a correction model 113 into a dialog system, according to certain embodiment described herein. This method 300 illustrates an overview of some embodiments. The method 300 depicted in FIG. 3, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 300 is intended to be illustrative and non-limiting. Although FIG. 3 depicts various activities occurring in a particular sequence or order, this is not intended to be limiting. In certain embodiments, for instance, the activities may be performed in a different order, or one or more activities of the method 300 may be performed in parallel. In certain embodiments, the method 300 may be performed at least in part by the correction system 200.

As shown in FIG. 3, at block 305 of the method 300, the correction system 200 accesses original training data 220. In some embodiments, the original training data 220 is or includes training data that might typically be used to train a semantic parser of a dialog system. For instance, the original training data 220 includes a set of original tuples, each original tuple including an utterance and a corresponding logical form.

At block 310, the correction system 200 converts the original training data 220 to corrective training data 260. For instance, as described below in detail, some embodiments of the correction system 200 apply a data-generation subsystem 250 to convert the original training data 220 to the corrective training data 260. The corrective training data 260 is thus based on the original training data 220 but is useable to train a correction model 113, which corrects errors between the ASR and the semantic parser.

At block 315, the correction system 200 trains the correction model 113 using the corrective training data 260. More specifically, for instance, the training subsystem 280 of the correction system 200 trains the correction model 113 based on the corrective training data 260. In some embodiments, the correction model 113 is a neural network such as a sequence-to-sequence (seq2seq) model; however, this need not be the case as the correction model 113 can be one or more of various ML models.

At block 320, the correction model 113 is inserted into the pipeline of a dialog system, such that the correction model 113 corrects output from the ASR during operation of the dialog system. In some embodiments, the dialog system has already been in operation, and the correction model 113 is inserted into the existing dialog system, such as by being inserted between the ASR and the semantic parser, in a retrofitting manner. In some other embodiments, however, the dialog system is not yet in use, and the correction model 113 is integrated into the dialog system prior to operation of the dialog operation.

Figure 4:
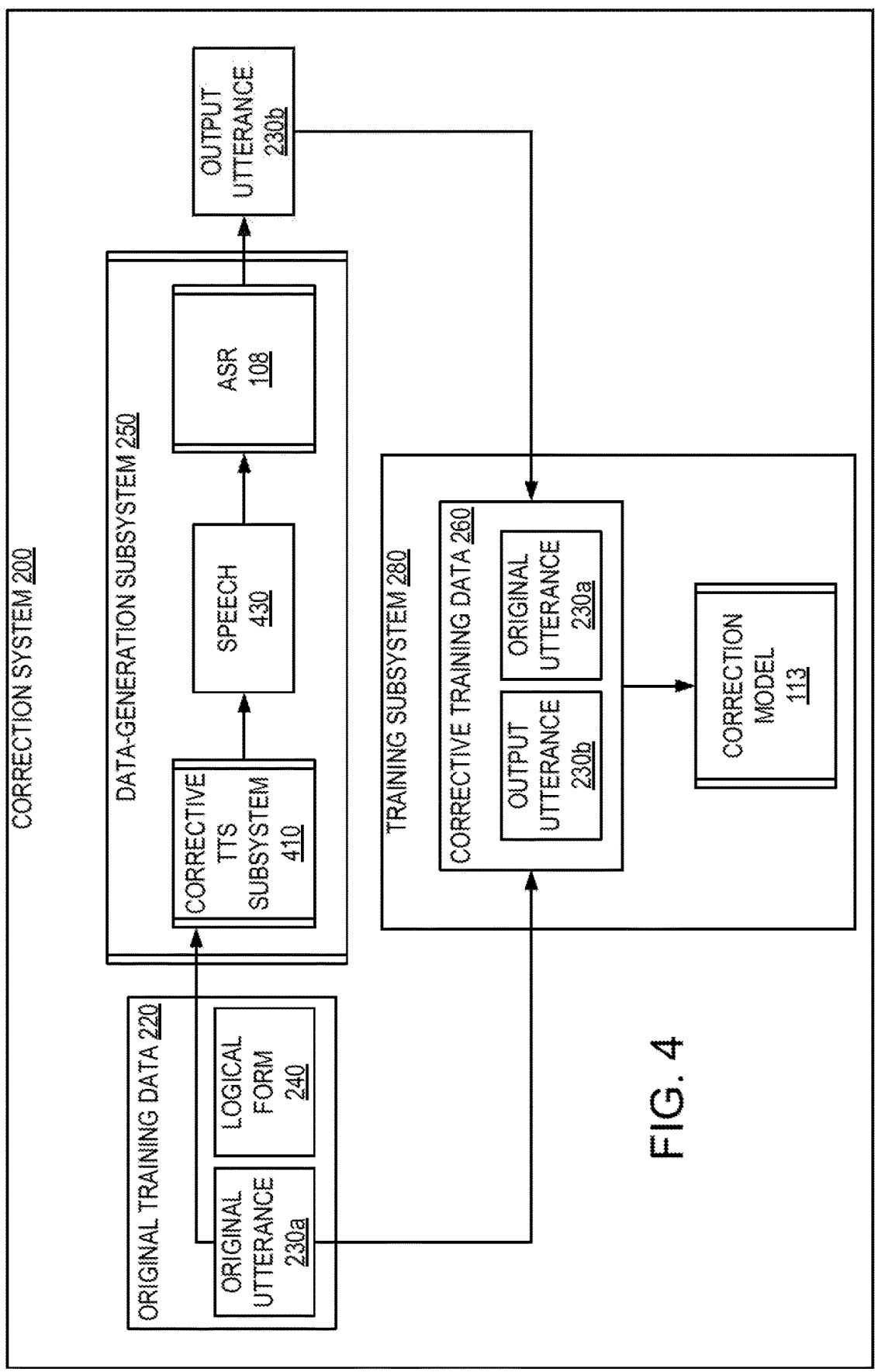
FIG. 4 is a diagram of another example of the correction system configured to train the correction model for inclusion in the dialog system, according to certain embodiments.

FIG. 4 is a diagram of an example of a correction system 200 configured to train a correction model 113 for inclusion in a dialog system, according to some embodiments described herein. The example of FIG. 4 is a specific instance of the correction system 200 shown in FIG. 2, and it will be understood that FIG. 4 does not limit the various embodiments described herein. As described above, some embodiments of the correction system 200 use a data-generation subsystem 250 to map original training data 220 to corrective training data 260. Specifically, in this example, the data-generation subsystem 250 includes a corrective TTS subsystem 410 and an ASR subsystem 108, also referred to as an ASR 108.

In some embodiments, the ASR 108 used in the correction system 200 to train the correction model 113 is the same ASR 108 used in the dialog system 100 in which the correction model 113 will operate. As a result, the correction model 113 is specifically tuned to that ASR 108 and learns to correct the types of errors actually made by the ASR 108 with which the correction model 113 will operate.

In some embodiments, the correction system 200 shown in FIG. 4 is implemented as a computing device or portion thereof, such as a server. The correction system 200 may be implemented as a specialized hardware device or as program code, or a combination of both. For instance, the operations described herein as being performed by the correction system 200 may be embodied in program code implementing the correction system 200, where such program code is executable by one or more processing units.

In some embodiments, the correction system 200 is configured to train a correction model 113. The correction model 113 may map an output utterance 230b, which was output by an ASR 108, to a corrected utterance 230. In so doing, the correction model 113 reduces errors in ASR output (i.e., output of the ASR 108), which leads to more accurate input (i.e., a better representation of speech input 104 received by the ASR 108) into the semantic parser and thus better results overall in the dialog system due to a reduction in propagated errors throughout the dialog system.

In some embodiments, the correction system 200 accesses original training data 220 including a set of original tuples, where each such original tuple may include an original utterance 230a and a corresponding logical form 240. Various techniques exist for obtaining this original training data 220, and one or more of such techniques may be used by the correction system 200. Tuples including utterances 230 and logical forms 240 are typically appropriate for training a semantic parser, and thus, the original training data 220 may be used, or useable, to train a semantic parser to map an utterance 230 to a logical form in the dialog system in addition to the use of the original training data 220 as described herein.

For each original tuple in the original training data 220, the correction system 200 may convert the original utterance 230a into a set of speeches 430, such as through the use of a corrective TTS subsystem 410. The corrective TTS subsystem 410 may be a TTS system that is used to generate speeches 430 for determining corrective training data 260 as described herein. The set of speeches 430 may include multiple speeches 430, and each speech 430 in the set may include a voice speaking the original utterance 230a. For example, each speech 430 may be an audio file or a portion of an audio file or other audio data. The speeches 430 in the set may vary in that some speeches 430 may be spoken in male voices while others are spoken in female voices, and the speeches 430 may vary in terms of accent or dialect. In general, the set of speeches 430 may represent varying ways in which the original utterance 230a can be accurately spoken.

In some cases, an ASR 108 may be better at translating audio with certain characteristics (e.g., certain accents), and thus, an utterance 230 spoken with various characteristics may be translated differently by the ASR 108 as compared to an utterance 230 without such characteristics. Ideally, however, each speech 430 generated based on the original utterance 230a would be mapped to the corresponding logical form 240 of the original tuple when being processed as speech input 104 through the dialog system 100. Various embodiments of the correction system 200 seek to achieve this mapping by training the correction model 113 based on these various speeches 430.

The correction system 200 may apply the ASR 108 to each speech 430 in the set of speeches 430 corresponding to the original utterance 230a, causing the ASR 108 to output a corresponding utterance 230, referred to herein as an output utterance 230b, for each such speech 430. As a result, the original utterance 230a may be associated with a set of output utterances 230b, each the result of applying the ASR 108 to a speech variant of the original utterance 230a. If the ASR 108 were perfect, then each output utterance 230b would match the original utterance 230a, but that is likely not the case.

An embodiment of the correction system 200 generates a subset of corrective tuples corresponding to the original utterance 230a, where each such corrective tuple includes the original utterance 230a and a corresponding output utterance 230b. The correction system 200 may generate such a corrective tuple for each output utterance 230b generated as described above corresponding to the original utterance 230a. This may result in a number of corrective tuples equal to the number of speeches 430 generated based on the original utterance 230a. In some embodiments, such a subset of corrective tuples is generated for each original utterance 230a in the original training data 220, and thus, the correction system 200 generates an aggregate set of corrective tuples for the various original utterances 230a in the original training data 220, each corrective tuple including an original utterance 230a and a corresponding output utterance 230b.

Some embodiments of the correction system 200 utilize the corrective tuples (i.e., the aggregate set representing the corrective tuples corresponding to each original utterance 230a) corresponding to the various original utterances 230a to train a correction model 113. In some embodiments, the correction model 113 is a sequence-to-sequence (seq2seq) ML model, but other ML models may be used additionally or alternatively. During training, the correction system 200 may identify the output utterance 230b of a corrective tuple as input and the original utterance 230a as the expected output, because the original utterance 230a accurately reflects the spoken text in the various speeches 430 and is thus accurate while the output utterance 230b potentially includes errors introduced by the ASR 108. Thus, after training and during operation, an embodiments of the correction model 113 maps an output utterance 230b (i.e., an utterance 230 output by the ASR 108) to a corrected utterance 230; the correction model 113 predicts the corrected utterance 230 based on a learned mapping of output utterances 230b to original utterances 230a, such that the corrected utterance 230 is a prediction of what an original utterance 230a would be. Thus, after training, the correction model 113 may be used to correct output of the ASR 108.

In some embodiments, due to having been trained as described herein, the correction model 113 is configured to make corrections to output of the ASR 108. Referring back to FIG. 1, in the dialog system 100, the ASR 108 determines and outputs an output utterance 230b corresponding to speech input 104 received by the dialog system 100. The correction model 113 receives the output utterance 230b, before or after tagging by the NER subsystem 112 if an NER subsystem 112 is included in the dialog system 100, and the correction model 113 maps the output utterance 230b to a corrected utterance 230c. In some embodiments, the corrected utterance 230c is a more accurate representation of the speech input 104 as compared to the output utterance 230b and, specifically, is a prediction of an original utterance 230a that would correspond to the output utterance 230b.

For example, upon receiving from the ASR 108 the output utterance "what are the abandoned theme parks cold," the correction model 113 could map this output utterance 230b to the corrected utterance "what are the abandoned theme parks called." For another example, upon receiving the output utterance "were in Edinburgh can I practice football," the correction model 113 could map this output utterance 230b to the corrected utterance "where in Edinburgh can I practice football." For yet another example, upon receiving the output utterance "how are butchers exist in purse," the correction model 113 may be configured to map this output utterance 230b to the corrected utterance "how many butchers exist in Paris." For yet another example, upon receiving the output utterance "are there any monuments in Marseille Inez so how many," the correction model 113 may be configured to map this output utterance 230b to the corrected utterance "are there any monuments in Marseille, and if so, how many."

In some embodiments, the semantic parser 114 receives the corrected utterance 230c and thus outputs a logical form 240. Due to the inclusion of the correction model 113 in the pipeline of the dialog system 100, the logical form 240 may exclude certain errors introduced by the ASR 108, because the correction model 113 corrects such errors. More generally, the pipeline of the dialog system 100 described herein is more effective at providing a dialog with a user as compared to a conventional dialog system. Through using the ASR 108 to determine corrective training data 260 that incorporates errors of the ASR 108, the correction model 113 may be configured to account for such errors and, thus, to learn an appropriate output in the existence of such errors. In some embodiments, the overall result is that some errors made by the ASR 108 are not propagated throughout the pipeline of the dialog system 100. The reduction in error propagation can result in an improved or more accurate response from the dialog manager subsystem 116 and, thus, an improved dialog between the user and the dialog system 100.

Figure 5:
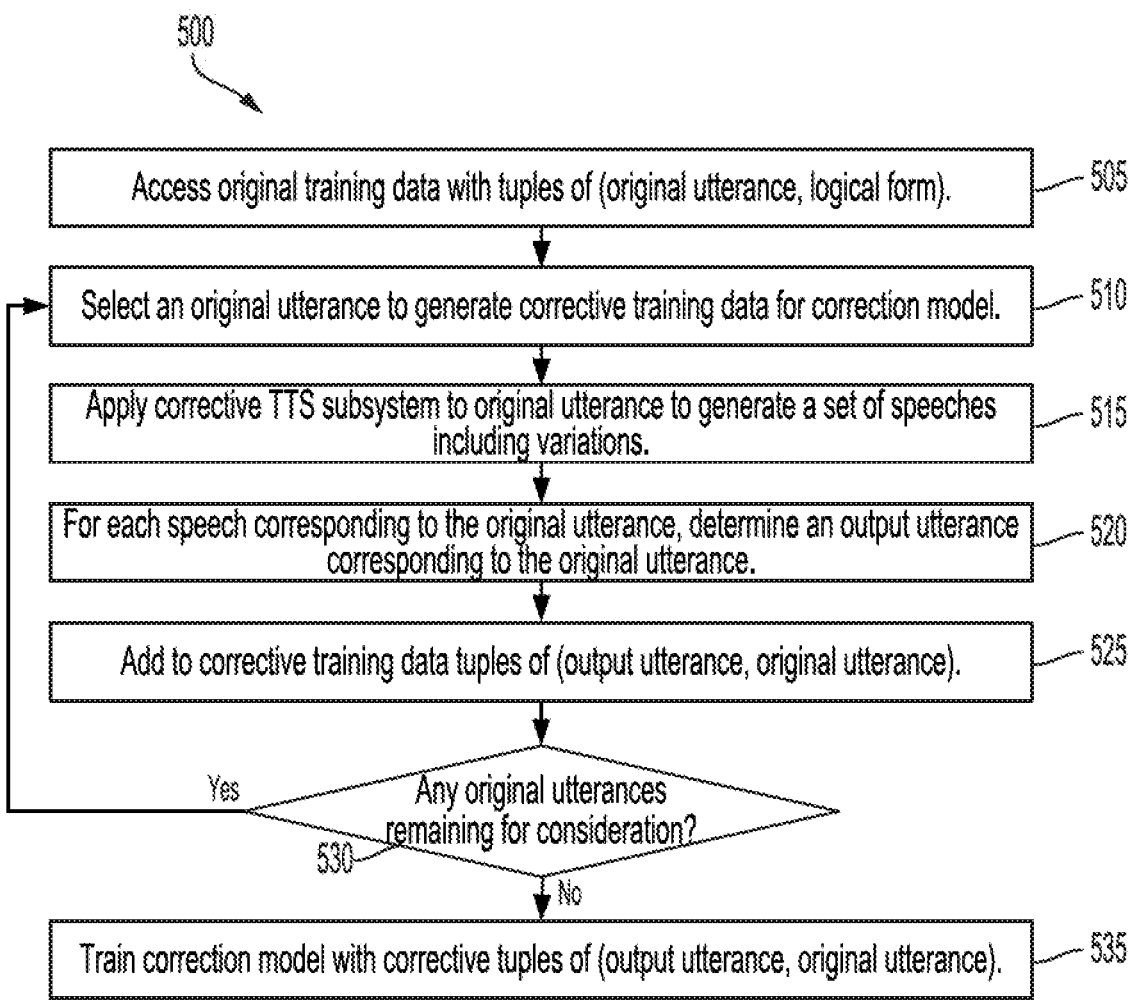
FIG. 5 is a diagram of a method of training the correction model to correct output from automatic speech recognition, according to certain embodiments.

FIG. 5 is a diagram of an example of a method 500 of training the correction model 113 to correct output from the ASR 108, according to some embodiments described herein. More specifically, some embodiments of the correction system 200 perform this method 500 or similar at blocks 310 and 315 of the more general method 300, in FIG. 3, described above. In some embodiments, the ASR 108 of the dialog system has already been trained before execution of this method 500. Other aspects of the dialog system, such as the semantic parser and a TTS subsystem, may be trained before, during, or after the execution of this method 500.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the correction system 200.

As shown in FIG. 5, at block 505, the correction system 200 accesses original training data 220 including original tuples, with each original tuple including an original utterance 230a and a logical form 240. The original training data 220 may be obtained through various techniques known in the art. For instance, the logical forms 240 in the original training data 220 were generated automatically by a computer system based on an established grammar, and the corresponding original utterances 230a were generated through crowdsourcing based on the logical forms 240. The resulting original training data 220 was then stored to a memory device readable by the correction system 200.

Block 510 begins a loop in which each original utterance 230a in the original training data 220 is considered per iteration. Specifically, at block 510, from the original training data 220, the correction system 200 selects an original utterance 230a from an original tuple that has not yet been considered. As described below, an original utterance 230a may be used to generate one or multiple corrective tuples used to train the correction model 113.

At block 515, the correction system 200 applies a corrective TTS subsystem 410 to the original utterance 230a to generate a set of speeches 430 that includes one or more speeches 430. In some embodiments, the corrective TTS subsystem 410 may be a high-quality TTS system. The corrective TTS subsystem 410 may, but need not, be the same TTS subsystem used during regular operation of the dialog system in which the correction model 113 will be used. In some embodiments, the TTS subsystem used during operation of the dialog system may be designed to be small, for instance, if the dialog system is executed by an embedded device. In that case, the TTS subsystem used during operation of the dialog system may have space limitations that result in accuracy limitations. In that case, it may be desirable to use a different, higher-quality TTS subsystem as the corrective TTS subsystem 410. The corrective TTS subsystem 410 may be an automated TTS system or may be implemented through manual activities. For instance, the corrective TTS subsystem 410 may be a trained ML model, or the corrective TTS subsystem 410 may be implemented as human speakers tasked with speaking the original utterance 230a for recording.

In some embodiments, the corrective TTS subsystem 410 may be applied to the original utterance 230a with multiple variations to result in various speeches 430 in the set corresponding to the original utterance 230a, where each speech 430 represents the original utterance 230a in a speech variant. For instance, the speeches 430 may represents various voices, accents, dialects, and genders.

At block 520, the correction system 200 applies the ASR 108 to each speech 430 corresponding to the original utterance 230a to determine an output utterance 230b. In other words, the ASR 108 may map each speech 430, in the set of speeches 430 corresponding to the original utterance 230a, to a corresponding output utterance 230b. As a result, the original utterance 230a may now be associated with a set of output utterances 230b provided by the ASR 108 based on speech variants of the original utterance 230a.

At block 525, the correction system 200 adds to a set of corrective training data 260 a set of corrective tuples, each corrective tuple including the original utterance 230a and a respective output utterance 230b. More specifically, for instance, such a corrective tuple may be added to the corrective training data 260 for each output utterance 230b that was generated based on the original utterance 230a, with each output utterance 230b being pairs with the shared original utterance 230a, resulting in adding to the corrective training data 260 a quantity of corrective tuples equal to the quantity of speeches 430 generated by the corrective TTS subsystem 410 based on the original utterance 230a.

At decision block 530, the training subsystem 280 determines whether any original utterances 230a remain to be considered in the original training data 220. If any such original utterances 230a remain, then the method 500 returns to block 510, where another original utterance 230a is selected for consideration. However, if all original utterances 230a in the original training data 220 have been considered, then the method 500 may proceed to block 535.

At block 535, the correction system 200 trains a correction model 113 with the corrective training data 260. In some embodiments, the correction model 113 is a seq2seq model, but other ML models may be used additionally or alternatively. For instance, the correction system 200 may train the correction model 113 with corrective tuples of the corrective training data 260, each corrective tuple including an original utterance 230a and a corresponding output utterance 230b, where the latter has been output from the ASR 108 itself. During training of the correction model 113, each output utterance 230b of a corrective tuple may be identified as input, and each corresponding original utterance 230a may be identified as the correct output given that input. Thus, in some embodiments, the correction system 200 may thereby train the correction model 113 to map output utterances 230b to corrected utterances 230, which are predictions of original utterances 230a.

Figure 6:
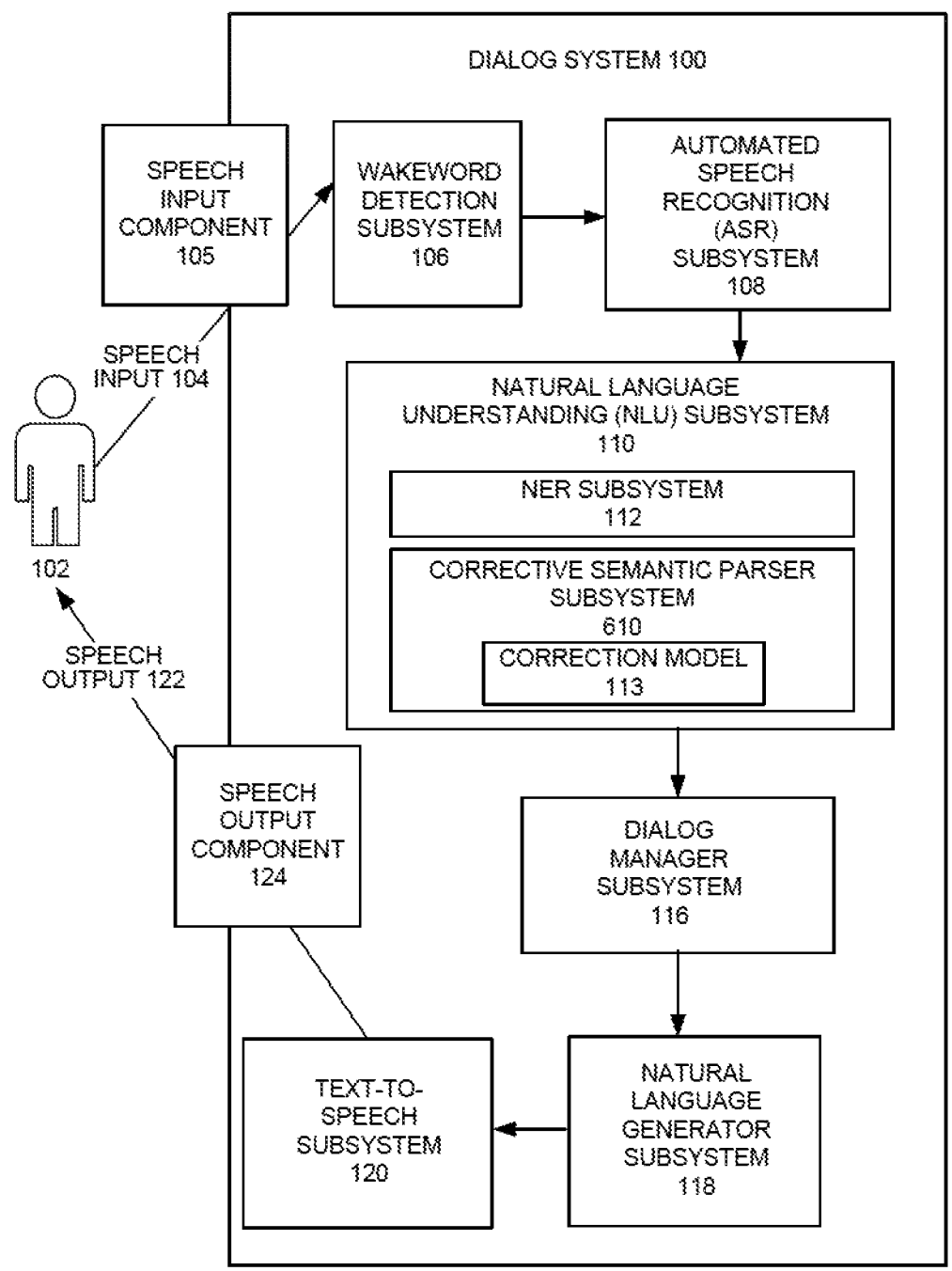
FIG. 6 is a diagram of an example of the dialog system utilizing a corrective semantic parser to reduce the propagation of errors resulting from automatic speech recognition, according to certain embodiments described herein.

FIG. 6 is a diagram of another example of the dialog system 100, according to some embodiments. Specifically, this example of the dialog system 100 is improved over a conventional dialog system by the incorporation of a corrective semantic parser 610, which incorporates a correction model 113, into its workflow. The example of the dialog system 100 shown in FIG. 6 is similar to the example of the dialog system 100 in FIG. 1 except that, in FIG. 6, the dialog system 100 includes a corrective semantic parser 610 as the semantic parser 114, and the corrective semantic parser 610 incorporates a correction model 113. Further, as shown in FIG. 6, no correction model 113 is needed between the ASR 108 and the corrective semantic parser 610 in some embodiments.

In the example dialog system 100 of FIG. 6, the ASR subsystem 108 is configured to generate an utterance 230 for each spoken clause and feed the utterances 230 to the NLU subsystem 110 for further processing. [0001] The NLU subsystem 110 receives utterances 230 generated by the ASR subsystem 108. The utterances 230 received by the NLU subsystem 110 from the ASR subsystem 108 may include text utterances corresponding to spoken words, phrases, clauses, or the like.

The NLU subsystem 110 translates each utterance 230, or a series of utterances 230, to a corresponding logical form. [0002] In certain implementations, the NLU subsystem 110 includes a named entity recognizer (NER) subsystem 112 and a semantic parser subsystem 114. The NER subsystem 112 receives an utterance 230 as input, identifies named entities in the utterance 230, and tags the utterance 230 with information related to the identified named entities. The tagged utterances 230 are then fed to the corrective semantic parser 610, which is configured to generate a logical form 240 for each tagged utterance 230, or for a series of tagged utterances 230, such that the logical form 240 incorporates corrections to errors introduced by the ASR 108 into the utterance 230. Logical forms 240 generated by the NLU subsystem 110 are then fed to the DM subsystem 116 for further processing.

In some embodiments described herein, the corrective semantic parser 610 is or includes an ML model. As described further below, the corrective semantic parser 610 learns errors typically made in the specific ASR subsystem 108 of the dialog system 100. As such, the corrective semantic parser 610 may correct those errors to prevent such errors from being passed forward in the logical form 240. [0003] The DM subsystem 116 is configured to manage a dialog with the user based on logical forms 240 received from the NLU subsystem 110.

Figure 7:
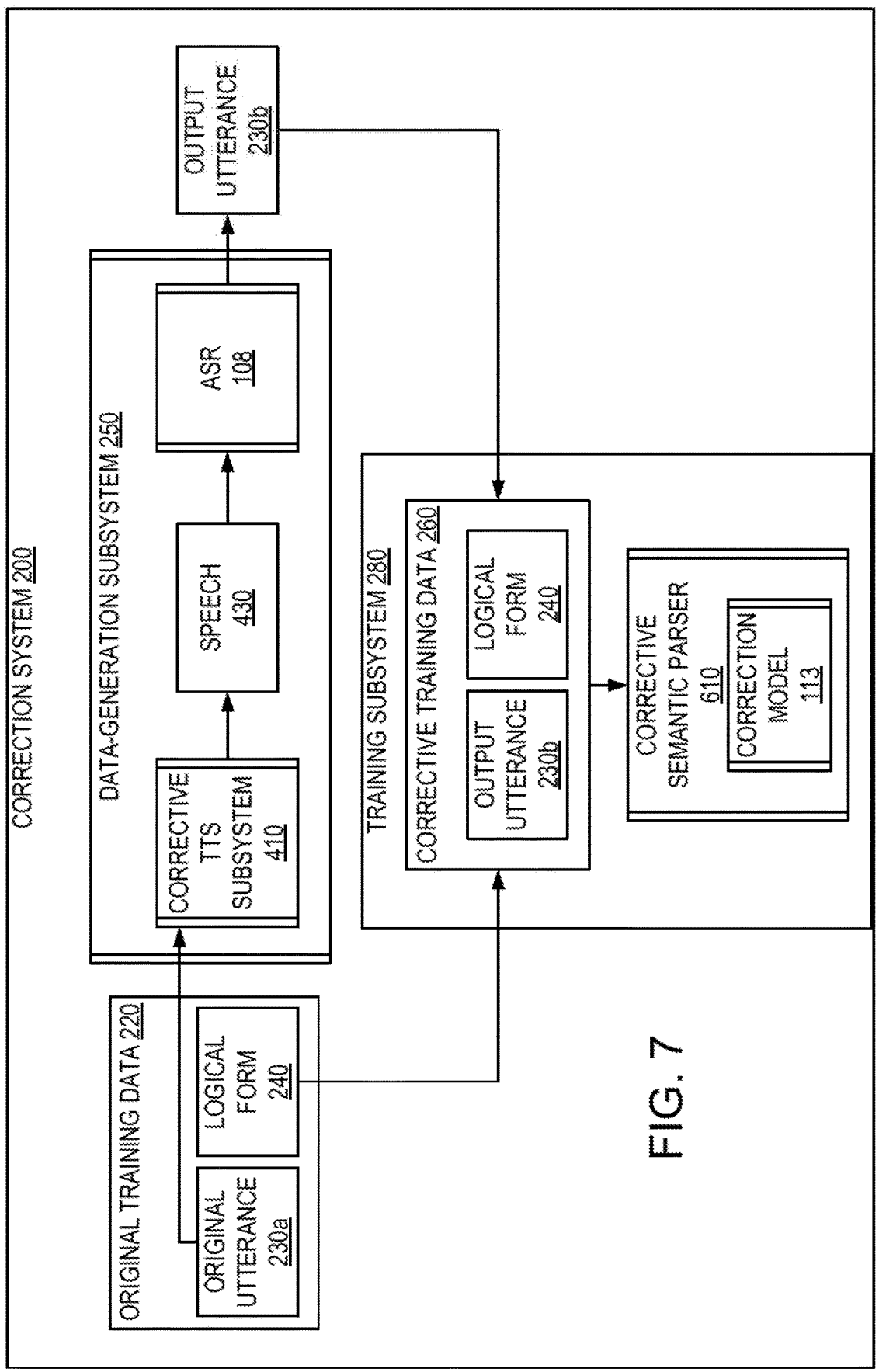
FIG. 7 is a diagram of an example of the correction system configured to train the corrective semantic parser for inclusion in the dialog system, according to certain embodiments.

FIG. 7 is a diagram of yet another example of the correction system 200, according to certain embodiments described herein. The example of FIG. 7 is a specific instance of the correction system 200 shown in FIG. 2, and it will be understood that FIG. 7 does not limit the various embodiments described herein. As described above, some embodiments of the correction system 200 use a data-generation subsystem 250 to map original training data 220 to corrective training data 260. Specifically, in this example, the data-generation subsystem 250 once again includes a corrective TTS subsystem 410 and an ASR 108. In this example, however, the correction system 200 is configured to train a corrective semantic parser 610 to include in a dialog system 100, according to some embodiments described herein. To this end, the corrective training data 260 includes different corrective tuples than those described in the example of FIG. 4.

In some embodiments, the ASR 108 used in the correction system 200 to train the corrective semantic parser 610 is the same ASR 108 used in the dialog system 100 in which the corrective semantic parser 610 will operate. As a result, the corrective semantic parser 610 is specifically tuned to that ASR 108 and learns to correct the types of errors actually made by the ASR 108 with which the corrective semantic parser 610 will operate.

In some embodiments, the corrective semantic parser 610 incorporates a correction model 113 in that the corrective semantic parser 610 implicitly corrects output utterances 230b from the ASR 108. As with a conventional semantic parser, the corrective semantic parser 610 may map an utterance 230 to a logical form 240. However, in some embodiments, the corrective semantic parser 610 is trained with corrective tuples and, as such, implicitly corrects errors in ASR output. This can lead to better results overall in the dialog system 100 due to a reduction in propagated errors throughout the dialog system 100.

As shown by a comparison of FIG. 4 to FIG. 7, various aspects of the workflow for providing a corrective semantic parser 610 are similar to those for providing a correction model 113 outside the corrective semantic parser 610. For instance, as shown in FIG. 7, the correction system 200 accesses a set of original training data 220 including a set of original tuples, where each such original tuple may include an original utterance 230a and a logical form 240.

For each original tuple in the original training data 220, the correction system 200 may convert the original utterance 230a into a set of speeches 430, such as through the use of a corrective ITS subsystem 410. The set of speeches 430 may include multiple such speeches 430, and each speech 430 may include a voice speaking the utterance 230. In general, the set of speeches 430 may represent varying ways in which the original utterance 230a can be accurately spoken. In some cases, an ASR 108 may be better at translating audio with certain characteristics (e.g., certain accents), and thus, an utterance 230 spoken with various characteristics may be translated differently by the ASR 108. Ideally, however, each speech 430 generated based on the original utterance 230a would be mapped to the corresponding logical form 240 when being processed as speech input 104 through the dialog system 100. Various embodiments of the correction system 200 seek to achieve this mapping. In this example, the correction system 200 provides a corrective semantic parser 610, which incorporates training directed toward such a mapping.

To this end, in some embodiments, the correction system 200 applies the ASR 108 to each speech 430 in the set of speeches 430 corresponding to the original utterance 230a, causing the ASR 108 to output a corresponding output utterance 230b for each such speech 430. As a result, the original utterance 230a may be associated with a set of output utterances 230b, each the result of applying the ASR 108 to a speech variant of the original utterance 230a. If the ASR 108 were perfect, then each output utterance 230b would match the original utterance 230a, but that is likely not the case.

An embodiment of the correction system 200 generates a subset of corrective tuples corresponding to the original utterance 230a and to the original tuple from which the original utterance 230a was selected. Each such corrective tuple may include the logical form 240 of the original utterance 230a, as identified in the original training data 220, and a corresponding output utterance 230b for that original utterance 230a. The correction system 200 may generate such a corrective tuple for each output utterance 230b generated as described above corresponding to the original utterance 230a. For each original utterance 230a, this may result in a subset of corrective tuples having a quantity equal to the number of speeches 430 generated based on the original utterance 230a. Thus, as the corrective training data 260, the correction system 200 generates an aggregate set of corrective tuples, each corrective including a logical form 240 and a corresponding output utterance 230b, for the various original utterances 230a (i.e., each original tuple) in the original training data 220.

An embodiment of the correction system 200 utilizes the corrective training data 260 (i.e., the aggregate set representing the corrective tuples corresponding to the various original utterances 230a) to train the corrective semantic parser 610. In some embodiments, the corrective semantic parser 610 is or includes a seq2seq model, but other ML models may be used additionally or alternatively. During training, the correction system 200 may identify the output utterance 230b of a corrective tuple as input and the logical form 240 as the expected output, because that logical form 240 accurately reflects the logical form 240 of the corresponding original utterance 230a, which is a corrected version of the output utterance 230b. Thus, the correction of output utterance 230b to original utterance 230a is implicit in the training.

In some embodiments, after training and during operation, the corrective semantic parser 610 maps an output utterance 230b (i.e., an utterance 230 output by the ASR 108) to a logical form 240. Specifically, after training, the corrective semantic parser 610 predicts a logical form 240 that corresponds to a theoretical original utterance 230a that might be represented by a given output utterance 230b. Correction of the output utterance 230b is therefore implicit based on the training provided, such that the corrective semantic parser 610 implicitly corrects errors in the output of the ASR 108.

In some embodiments, due to having been trained as described herein, the corrective semantic parser 610 is configured to generate logical forms 240 that incorporate corrections to output of the ASR 108. Referring back to FIG. 6, in the dialog system 100, the ASR 108 determines and outputs an output utterance 230b corresponding to speech input 104 received by the dialog system 100. The corrective semantic parser 610 receives the output utterance 230b, potentially after tagging by the NER subsystem 112 if an NER subsystem 112 is included in the dialog system 100, and the corrective semantic parser 610 maps the output utterance 230b to a logical form 240 that corresponds to a potential corrected utterance 230c. In other words, the corrective semantic parser 610 implicitly corrects the output utterance 230b when determining the logical form 240.

For example, upon receiving the output utterance "what are the abandoned theme parks cold," the corrective semantic parser 610 may be configured to map this output utterance 230b to the logical form "query(nwr(keyval('abandoned:tourism', 'theme_park')), qtype(findkey('name')))," which is a logical form 240 of the corrected utterance "what are the abandoned theme parks called." For another example, upon receiving the output utterance "were in Edinburgh can I practice football," the corrective semantic parser 610 may be configured to map this output utterance 230b to the logical form "query(area(keyval('name', 'City_of_Edinburgh')), nwr(keyval('sport', 'soccer')), qtype(least(topx(1))))," which is a logical form 240 of the corrected utterance "where in Edinburgh can I practice football." For yet another example, upon receiving the output utterance "how are butchers exist in purse," the corrective semantic parser 610 may be configured to map this output utterance 230b to the logical form "query(area(keyval('name', 'Paris'), keyval('is_in:country', 'France')), nwr(keyval('shop', 'butcher')), qtype(count))," which is a logical form 240 of the corrected utterance "how many butchers exist in Paris." For yet another example, upon receiving the output utterance "are there any monuments in Marseille Inez so how many," the corrective semantic parser 610 may be configured to map this output utterance 230b to the logical form "query(area(keyval('name', 'Marseille')), nwr(keyval('historic', 'monument')), qtype(least(topx(1)), count))," which is a logical form 240 of the corrected utterance "are there any monuments in Marseille, and if so, how many."

In some embodiments, the dialog manager subsystem 116 analyzes the logical form 240 and determines a response based on processing that logical form 240. Due to use of the corrective semantic parser 610 to address errors in the ASR output, the logical form 240 may exclude certain errors introduced by the ASR 108. More generally, the pipeline of the dialog system 100 described herein is more effective at providing a dialog with a user as compared to a conventional dialog system. Through using the ASR 108 to determine corrective training data 260 that incorporates errors of the ASR 108, the corrective semantic parser 610 may be configured to account for such errors and, thus, to learn an appropriate output in the existence of such errors. In some embodiments, the overall result is that some errors made by the ASR 108 are not propagated throughout the pipeline of the dialog system 100. The reduction in error propagation can result in an improved or more accurate response from the dialog manager subsystem 116 and, thus, an improved dialog between the user and the dialog system 100.

Figure 8:
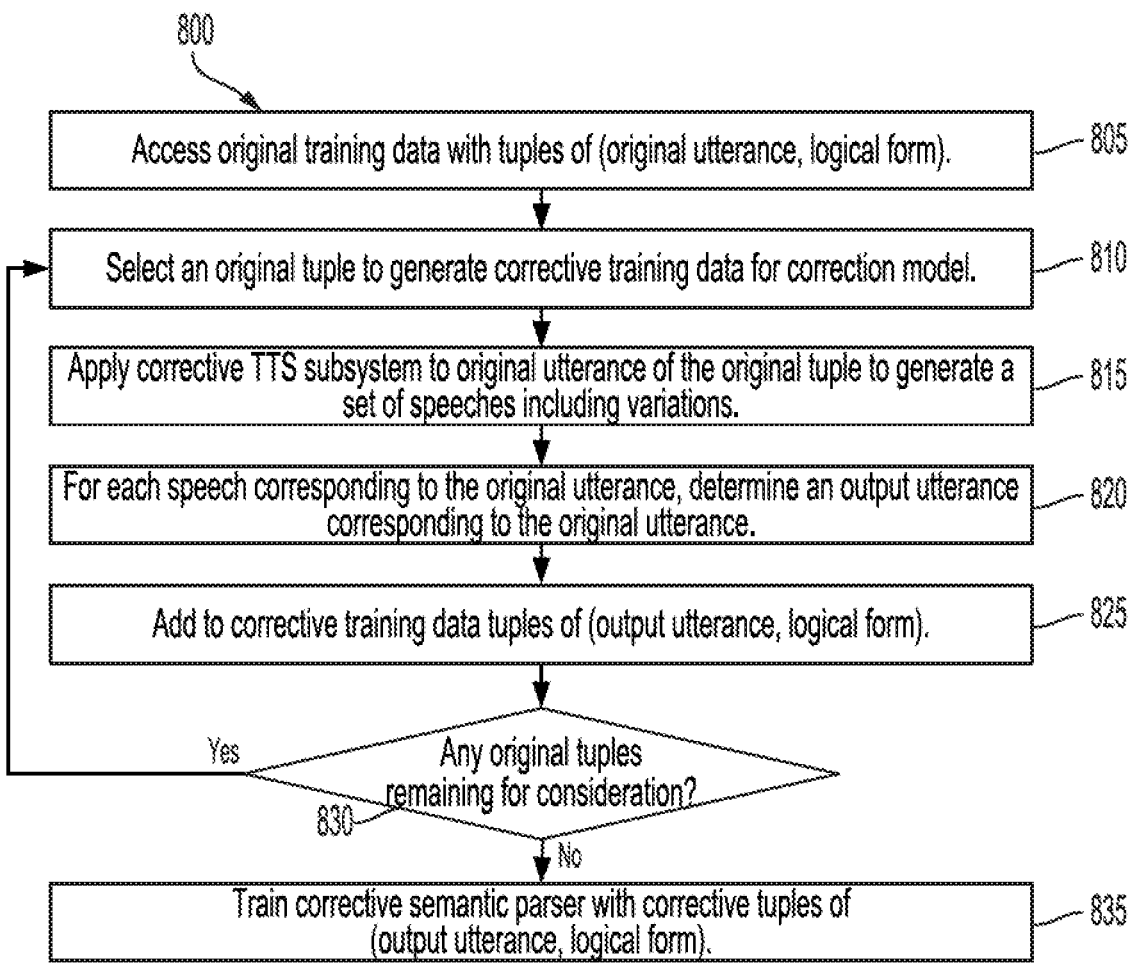
FIG. 8 is a diagram of a method of training the corrective semantic parser to implicitly correct output from automatic speech recognition when determining a logical form, according to certain embodiments.

FIG. 8 is a diagram of an example of a method 800 of training a corrective semantic parser 610 to implicitly correct output from the ASR 108 when determining a logical form 240, according to some embodiments described herein. More specifically, some embodiments of the correction system 200 perform this method 800 or similar at blocks 310 and 315 of the more general method 300, in FIG. 3, described above. In some embodiments, the ASR 108 of the dialog system 100 has already been trained before execution of this method 800. Other aspects of the dialog system 100, such as the TTS subsystem 560, may be trained before, during, or after the execution of this method 800. Further, the corrective semantic parser 610 may already have been trained with original training data 220 or other training data, in which case this method 800 includes further training for the corrective semantic parser 610.

The method 800 depicted in FIG. 8, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 800 is intended to be illustrative and non-limiting. Although FIG. 8 depicts various activities occurring in a particular sequence or order, this is not intended to be limiting. In certain embodiments, for instance, the activities may be performed in a different order, or one or more activities of the method 800 may be performed in parallel. In certain embodiments, the method 800 may be performed by the correction system 200.

As shown in FIG. 8, at block 805, the correction system 200 accesses original training data 220 including original tuples, with each original tuple including an original utterance 230*a* and a logical form 240. In some embodiments, the original training data 220 has already been used, or will be used, to train the corrective semantic parser 610 in addition to use of the corrective tuples as described herein. The original training data 220 may be obtained through various techniques known in the art. For instance, the logical forms 240 in the original training data 220 were generated automatically by a computer system based on an established grammar, and the corresponding original utterances 230*a* were generated through crowdsourcing based on the logical forms 240. The resulting original training data 220 was then stored to a memory device readable by the correction system 200.

Block 810 begins a loop in which each original tuple in the original training data 220 is considered per iteration. At block 810, from the original training data 220, the correction system 200 selects an original utterance 230*a* from an original tuple that has not yet been considered. As described below, an original utterance 230*a* may be used to generate multiple corrective tuples used to train the correction model 113.

At block 815, the correction system 200 applies a corrective TTS subsystem 410 to the original utterance 230*a* to generate a set of speeches 430. In some embodiments, the corrective TTS subsystem 410 may be a high-quality TTS subsystem. The corrective TTS subsystem 410 applied may be, but need not be, the same TTS subsystem 120 used during regular operation of the dialog system 100. In some embodiments, the TTS subsystem 120 used during operation of the dialog system 100 may be designed to be small, for instance, if the dialog system 100 is executed by an embedded device. In that case, the TTS subsystem 120 used during operation of the dialog system 100 may have space limitations that result in accuracy limitations. In that case, it may be desirable to use a different, higher-quality TTS subsystem for correcting ASR output as described herein with respect to the corrective TTS subsystem 410. The corrective TTS subsystem 410 may be an automated TTS subsystem, or the corrective TTS subsystem 410 may include manual activities. For instance, the corrective TTS subsystem 410 may be a trained ML model, or the corrective TTS subsystem 410 may be implemented as human speakers tasked with speaking the original utterance 230*a* for recording.

In some embodiments, the corrective TTS subsystem 410 may be applied to the original utterance 230*a* with multiple variations to result in various speeches 430 in the set corresponding to the original utterance 230*a*, where each speech 430 represents the original utterance 230*a*. For instance, the speeches 430 may represents various voices, accents, dialects, and genders.

At block 820, the correction system 200 applies the ASR 108 to each speech 430 corresponding to the original utterance 230*a* to determine an output utterance 230*b*. In other words, the ASR 108 may map each speech 430, in the set of speeches 430 corresponding to the original utterance 230*a*, to a corresponding output utterance 230*b*. As a result, the original utterance 230*a* may now be associated with a set of output utterances 230*b* provided by the ASR 108 based on spoken versions of the original utterance 230*a*.

At block 825, the correction system 200 adds to a set of corrective training data 260 a set of corrective tuples, each corrective tuple including an output utterance 230*b* and the logical form 240 for the original utterance 230*a*. More specifically, for instance, such a corrective tuple may be added to the corrective training data 260 for each output utterance 230*b* that was generated based on the original utterance 230*a*, resulting in adding to the corrective training data 260 a quantity of corrective tuples equal to the quantity of speeches 430 generated by the corrective TTS subsystem 410 based on the original utterance 230*a*.

At decision block 830, the training subsystem 280 determines whether any original tuples remain to be considered in the original training data 220. If any such original tuple remains, then the method 800 returns to block 810, where another original tuple is selected for consideration. However, if all original tuples in the original training data 220 have been considered, then the method 800 may proceed to block 835.

At block 835, the correction system 200 trains the corrective semantic parser 610 with the corrective training data 260. For instance, the correction system 200 may train the corrective semantic parser 610 with corrective tuples, each corrective tuple including an output utterance 230*b* and a corresponding logical form 240, where the former has been output from the ASR 108 and the latter is the accurate logical form 240 selected from the original training data 220. During training of the corrective semantic parser 610, each output utterance 230b of a corrective tuple may be identified as input, and each corresponding logical form 240 may be identified as the correct output given that input. Thus, in some embodiments, the correction system 200 may thereby train the corrective semantic parser 610 to map variations of a corrected utterance 230 (i.e., the original utterance 230a), such variations being embodied in the corresponding output utterances 230b, to the logical form 240 for that corrected utterance 230.

Figure 9:
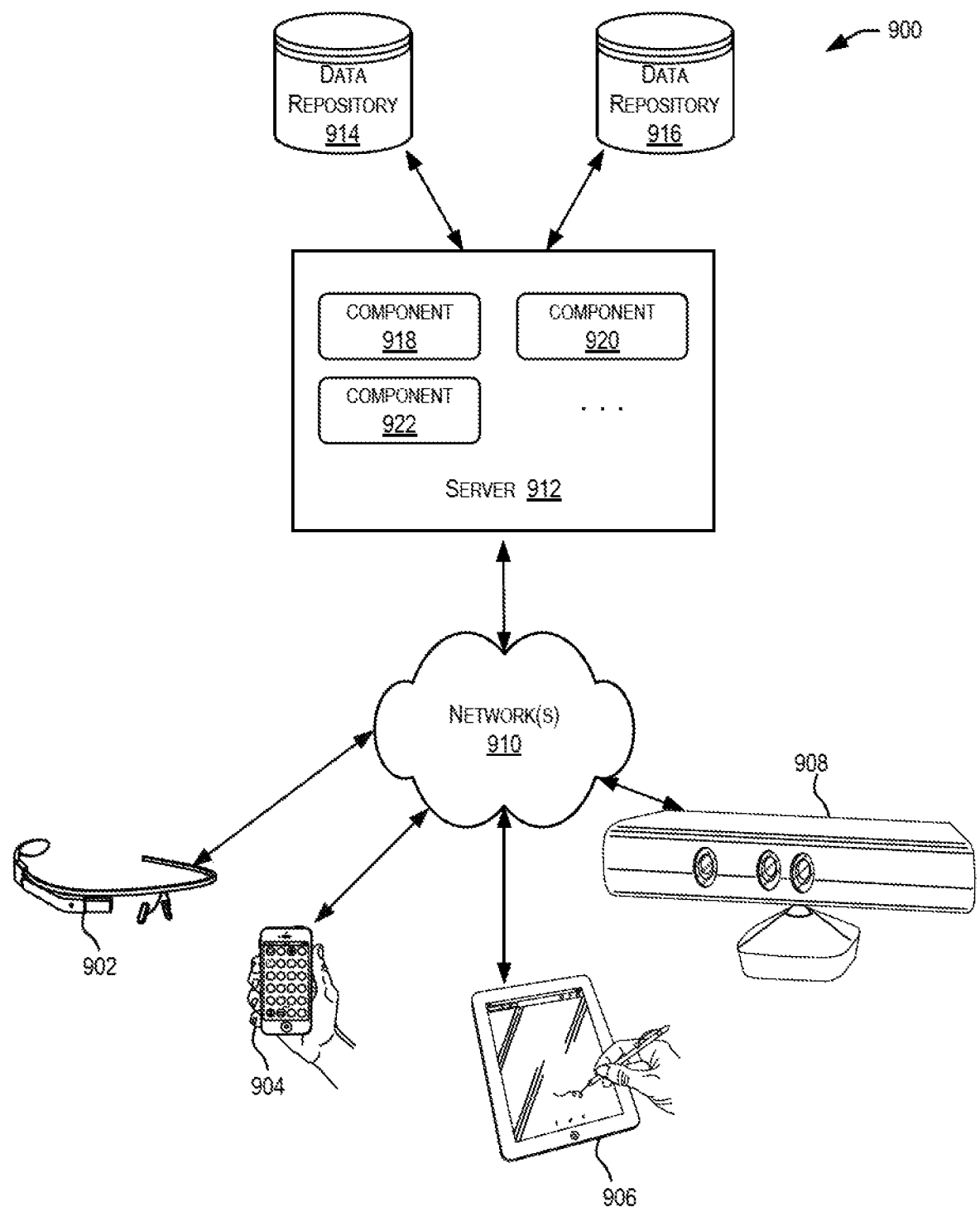
FIG. 9 is a diagram of a distributed system for implementing certain embodiments.

FIG. 9 is a diagram of a distributed system 900 for implementing certain embodiments. In the illustrated embodiment, distributed system 900 includes one or more client computing devices 902, 904, 906, and 908, coupled to a server 912 via one or more communication networks 910. Clients computing devices 902, 904, 906, and 908 may be configured to execute one or more applications.

In various embodiments, server 912 may be adapted to run one or more services or software applications that enable training or use of the correction model 113 or the corrective semantic parser 610. For instance, server 912 may execute some or all aspects of the correction system 200 or some or all aspects of the dialog system 100.

In certain embodiments, server 912 may also provide other services or software applications that can include non-virtual and virtual environments. In some embodiments, these services may be offered as web-based or cloud services, such as under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components. More specifically, for instance, each of client computing devices 902, 904, 906, and/or 908 may be an embedded device configured to execute the dialog system 100 and, further, configured to communicate with server 912 to enable server 912 to train a correction model 113 or a corrective semantic parser 610 for use in the dialog system 100.

In the configuration depicted in FIG. 9, server 912 may include one or more components 918, 920 and 922 that implement the functions performed by server 912. These components may include software components that may be executed by one or more processors, hardware components, or combinations thereof. It should be appreciated that various different system configurations are possible, which may be different from distributed system 900. The embodiment shown in FIG. 9 is thus one example of a distributed system for implementing an embodiment system and is not intended to be limiting.

Users may use client computing devices 902, 904, 906, and/or 908 to interact with aspects of the dialog system 100 provided by server 912 in accordance with the teachings of this disclosure. A client device may provide an interface (e.g., a speech interface) that enables a user of the client device to interact with the client device. The client device may also output information to the user via this interface. Although FIG. 9 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 910 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization such as one or more flexible pools of logical storage devices that can be virtualized to maintain virtual storage devices for the server. In various embodiments, server 912 may be adapted to run one or more services or software applications that provide the functionality described in the foregoing disclosure.

The computing systems in server 912 may run one or more operating systems including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more data repositories 914, 916. These data repositories may be used to store data and other information in certain embodiments. For example, one or more of data repositories 914, 916 may be used to store data required to train or operate the correction model 113 or the corrective semantic parser 610. Data repositories 914, 916 may reside in a variety of locations. For example, a data repository used by server 912 may be local to server 912 or may be remote from server 912 and in communication with server 912 via a network-based or dedicated connection. Data repositories 914, 916 may be of different types. In certain embodiments, a data repository used by server 912 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 914, 916 may also be used by applications to store application data. The data repositories used by applications may be of different types such as, for example, a key-value store repository, an object store repository, or a general storage repository supported by a file system.

Figure 10:
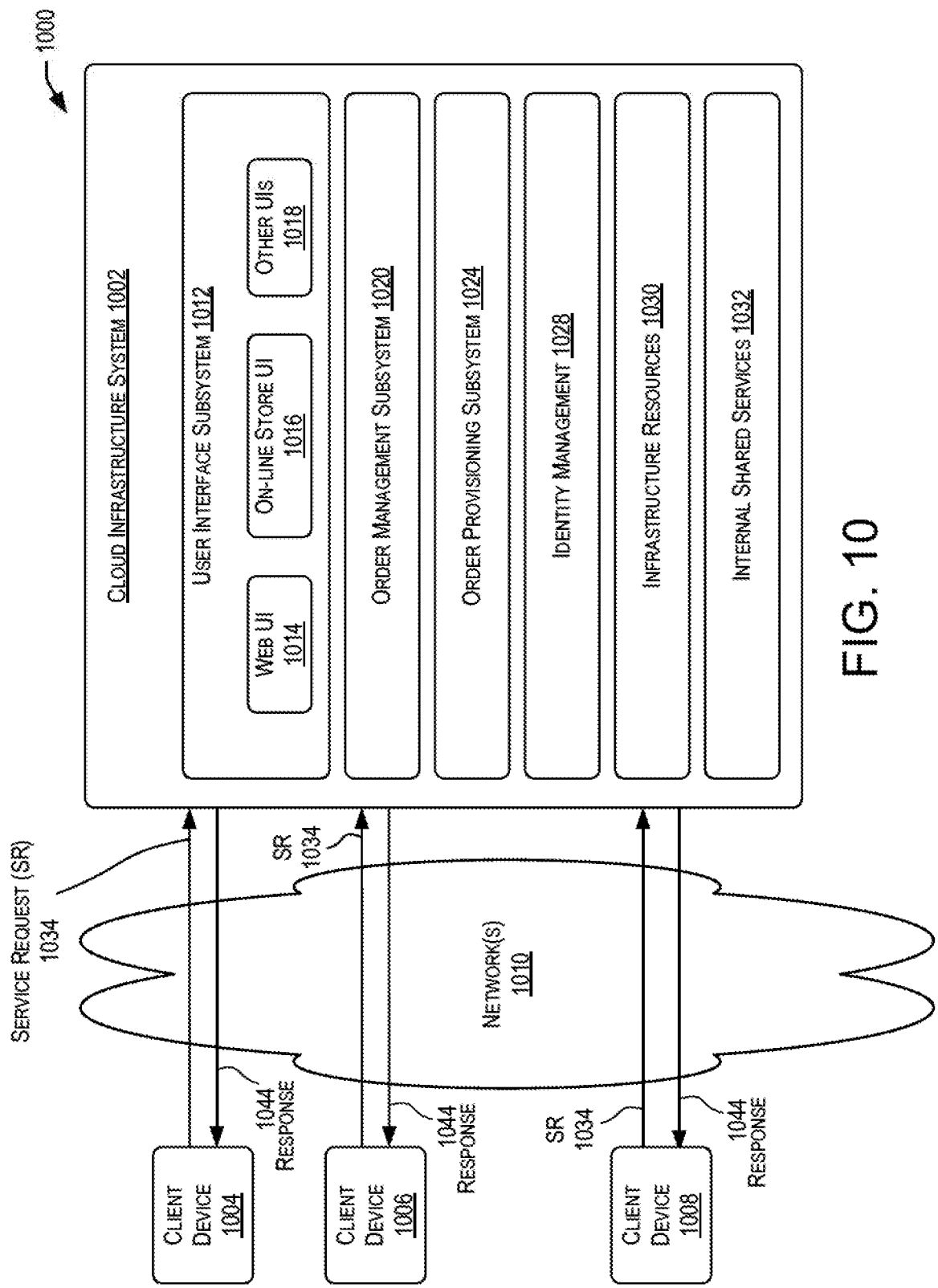
FIG. 10 is a diagram of a cloud-based system environment in which training or use of the correction model or the corrective semantic parser may be offered at least in part as a cloud service, according to certain embodiments.

In certain embodiments, all or a portion of training or utilizing the correction model 113 or the corrective semantic parser 610 may be offered as services via a cloud environment. FIG. 10 is a block diagram of a cloud-based system environment in which training or use of the correction model 113 or the corrective semantic parser 610 may be offered at least in part as a cloud service, in accordance with certain embodiments. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between client computing devices 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some other embodiments, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative embodiments.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation. Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1002.

Cloud infrastructure system 1002 then performs processing to provide the services requested in the customer's subscription order. For example, a customer may subscribe to information services or other services provided by the dialog system 100 in conversational form. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public customer, where the customer can be an individual or an enterprise. In certain other embodiments, under a private cloud model, cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as client computing devices 902, 904, 906, and 908 depicted in FIG. 9) and may be capable of operating one or more client applications. A user may use a client computing device to interact with cloud infrastructure system 1002, such as to request a service provided by cloud infrastructure system 1002. An attacker may use a client device to send malicious requests.

In some embodiments, the processing performed by cloud infrastructure system 1002 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1002 for providing training or use of the correction model 113 or the corrective semantic parser 610 as described herein. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like.

In certain embodiments, to facilitate efficient provisioning of these resources for supporting the various cloud services provided by cloud infrastructure system 1002 for different customers, the infrastructure resources 1030 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and that facilitate the provisioning of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a customer may, using a client device, request (service request 1034) one or more services provided by cloud infrastructure system 1002 using one or more of interfaces 1014, 1016, and 1018. For example, a customer may access the online store, browse cloud services offered by cloud infrastructure system 1002, and place a subscription order for one or more services offered by cloud infrastructure system 1002 that the customer wishes to subscribe to. The service request may include information identifying the customer and one or more services that the customer desires to subscribe to.

In certain embodiments, such as the embodiment depicted in FIG. 10, cloud infrastructure system 1002 may comprise an order management subsystem (OMS) 1020 that is configured to process the new order. As part of this processing, OMS 1020 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1020 may then invoke an order provisioning subsystem (OPS) 1024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like.

The allocated pods may then be customized for the particular requesting customer for providing the requested service.

Cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services.

Cloud infrastructure system 1002 may provide services to multiple customers. For each customer, cloud infrastructure system 1002 is responsible for managing information related to one or more subscription orders received from the customer, maintaining customer data related to the orders, and providing the requested services to the customer. Cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1002 may provide services to multiple customers in parallel. Cloud infrastructure system 1002 may store information for these customers, including possibly proprietary information. In certain embodiments, cloud infrastructure system 1002 comprises an identity management subsystem (IMS) 1028 that is configured to manage customers information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

Figure 11:
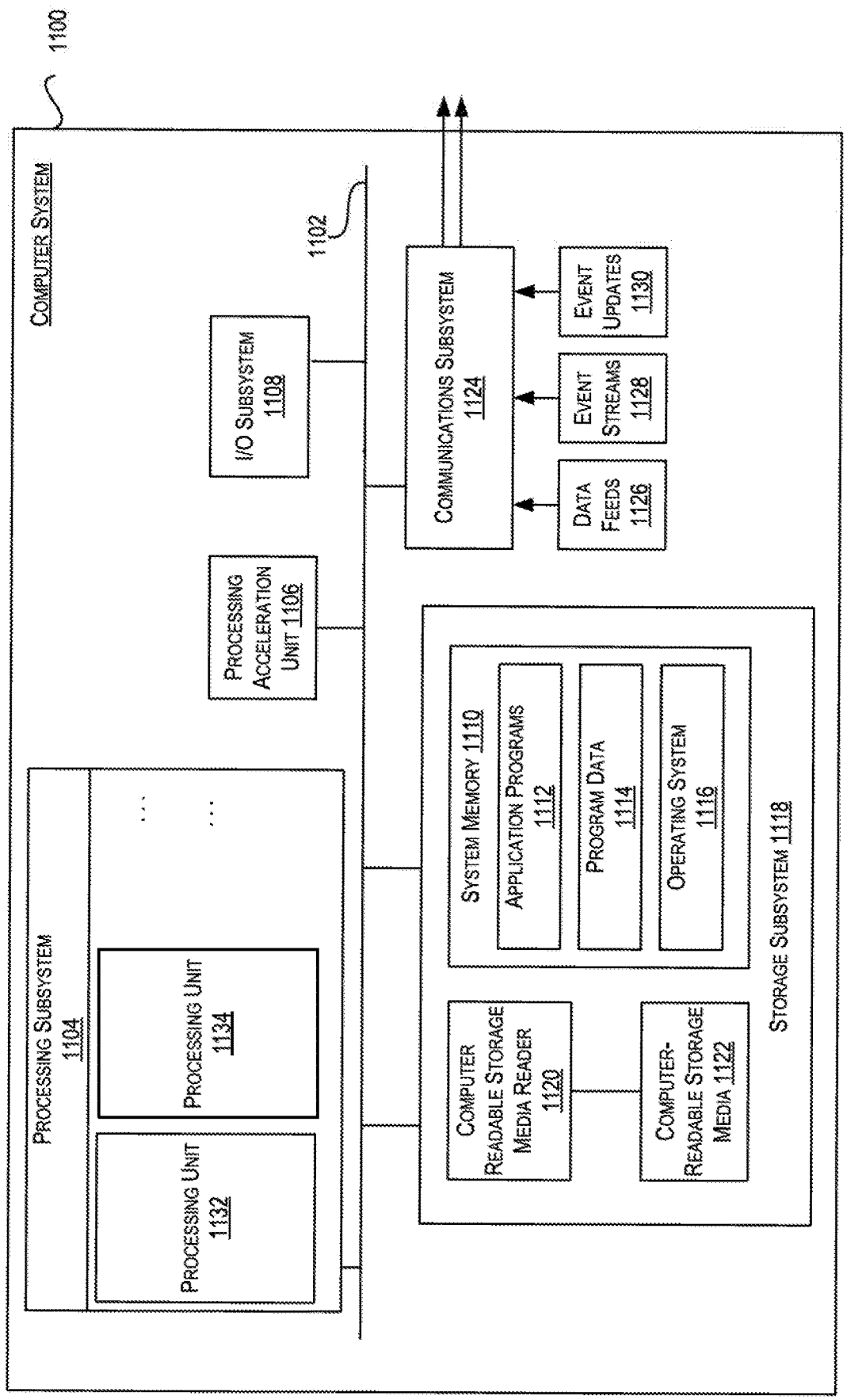
FIG. 11 is a diagram of an example computer system that may be used to implement certain embodiments.

FIG. 11 is a block diagram of an example computer system 1100 that may be used to implement certain embodiments. For example, in some embodiments, computer system 1100 may be used to implement any of systems, subsystems, and components described herein. For example, multiple host machines may implement training or use of the correction model 113 or the semantic parser 114. Computer systems such as computer system 1100 may be used as host machines. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may include be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer-readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain embodiments, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Sir navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some embodiments. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing training or use of the correction model 113 or the corrective semantic parser 610 may be executed in system memory 1110.

Computer-readable storage media 1122 may store programming and data constructs that provide the functionality of some embodiments. Computer-readable storage media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1118 may also include a computer-readable storage media reader 1120 that can further be connected to computer-readable storage media 1122. Reader 1120 may receive and be configured to read data from a memory device such as a disk, a flash drive, etc.

In certain embodiments, computer system 1100 may support virtualization technologies, including but not limited to virtualization of processing and memory resources. For example, computer system 1100 may provide support for executing one or more virtual machines. In certain embodiments, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   accessing training data comprising tuples, a first tuple of the tuples comprising an utterance, wherein the utterance is a textual representation of speech;
   utilizing an automatic speech recognition (ASR) subsystem of a dialog system to convert the utterance to first output utterance comprising text of a first speech variant of the utterance;

utilizing the ASR subsystem of the dialog system to convert the utterance to a second output utterance comprising text of a second speech variant of the utterance;

storing the first output utterance and the second output utterance in corrective training data based on the training data; and training a correction model based on the corrective training data to generate a trained correction model, the trained correction model configured to process output of the ASR subsystem of the dialog system.

2. The method of claim 1, wherein utilizing the ASR subsystem of the dialog system to convert the utterance to the first output utterance comprises:

generating a speech comprising an audio version of the utterance in the first tuple; and determining the first output utterance by applying the ASR subsystem to the speech.

3. The method of claim 2, wherein utilizing the ASR subsystem of the dialog system to convert the utterance to the second output utterance comprises:

generating a second speech comprising a second audio version of the utterance in the first tuple; and determining the second output utterance by applying the ASR subsystem to the second speech.

4. The method of claim 2, wherein generating the speech comprises applying a text-to-speech subsystem to the utterance in the first tuple to determine the speech.

5. The method of claim 1, wherein:

the first tuple further comprises a logical form corresponding to the utterance, wherein the logical form is a syntactic expression of the utterance according to an established grammar;

storing the first output utterance and the second output utterance in the corrective training data based on the training data comprises combining the first output utterance and the logical form into a corrective tuple of the corrective training data; and the correction model is integrated with a corrective semantic parser configured to map utterances to logical forms.

6. The method of claim 5, wherein storing the first output utterance and the second output utterance in the corrective training data based on the training data further comprises:

storing the second output utterance and the logical form of the first tuple into a second corrective tuple of the corrective training data.

7. The method of claim 1, wherein storing the first output utterance and the second output utterance in the corrective training data based on the training data comprises:

combining the first output utterance and the utterance into a first corrective tuple of the corrective training data; and combining the second output utterance and the utterance into a second corrective tuple of the corrective training data.

8. The method of claim 7, further comprising including the correction model in the dialog system between the ASR subsystem and a semantic parser of the dialog system, the ASR subsystem configured to map speeches to utterances, and the semantic parser configured to map utterances to logical forms.

9. The method of claim 8, further comprising:

receiving, by the dialog system, a first utterance output by the ASR subsystem;

providing, by the dialog system, the first utterance from the ASR subsystem to the correction model to determine a corrected utterance; and inputting, by the dialog system, the corrected utterance to the semantic parser.

10. A system comprising:

a data-generation subsystem configured to:

access training data comprising tuples, a first tuple of the tuples comprising an utterance, wherein the utterance is a textual representation of speech;

generate a first audio version of the utterance, wherein the first audio version comprises a first speech variant of the utterance;

convert the first audio version of the utterance to a first output utterance;

generate a second audio version of the utterance, wherein the second audio version comprises a second speech variant of the utterance; and convert the second audio version of the utterance to a second output utterance; and a training subsystem configured to train a correction model, based on the the utterance, the first output utterance, and the second output utterance, to generate a trained correction model, the trained correction model configured to process output of an automatic speech recognition (ASR) subsystem of a dialog system.

11. The system of claim 10, wherein, to generate the first audio version, the data-generation subsystem is further configured to apply a text-to-speech subsystem to the utterance in the first tuple to determine the first audio version.

12. The system of claim 10, wherein:

the first tuple further comprises a logical form corresponding to the utterance, wherein the logical form is a syntactic expression of the utterance according to an established grammar; and the data-generation subsystem is further configured to:

combine the first output utterance and the logical form into a first corrective tuple of the corrective training data; and combine the second output utterance and the logical form into a second corrective tuple of the corrective training data.

13. The system of claim 12, wherein the correction model is integrated with a corrective semantic parser configured to map utterances to logical forms of corrected versions of the utterances.

14. The system of claim 10, wherein the data-generation subsystem is further configured to:

combine the first output utterance and the utterance into a first corrective tuple of the corrective training data; and combine the second output utterance and the utterance into a second corrective tuple of the corrective training data.

15. The system of claim 14, further comprising a dialog system comprising:

the ASR subsystem configured, as part of the dialog system, to map speeches to utterances, wherein the ASR subsystem is a first prediction model;

a semantic parser configured to map utterances to logical forms, wherein the semantic parser is a second prediction model; and the correction model configured, as part of the dialog system, to:

receive a first utterance output by the ASR subsystem; and generate a corrected utterance for use by the semantic parser.

16. The system of claim 10, wherein the correction model is a sequence-to-sequence prediction model.

17. The system of claim 10, wherein:
- to convert the first audio version of the utterance to the first output utterance, the data-generation subsystem is configured to apply the ASR subsystem to the first audio version of the utterance; and
- to convert the second audio version of the utterance to the second output utterance, the data-generation subsystem is configured to apply the ASR subsystem to the second audio version of the utterance.

18. A computer-program product for configuring a correction model to correct output from an automatic speech recognition (ASR) subsystem of a dialog system, the computer-program product comprising a computer-readable storage medium having program instructions embodied thereon, the program instructions executable by one or more processors to cause the one or more processors to perform a method comprising:
- accessing training data comprising tuples, a first tuple of the tuples comprising an utterance, wherein the utterance is a textual representation of speech;
- generating a first output utterance comprising text of a first speech variant of the utterance;
- generating a second output utterance comprising text of a second speech variant of the utterance, wherein the second output utterance differs from the first output utterance; and
- storing the utterance and the first output utterance in a first corrective tuple of corrective training data based on the training data;
- storing the utterance the second output utterance in a second corrective tuple of the corrective training data based on the training data; and
- training the correction model based on the corrective training data to generate a trained correction model, the trained correction model configured to map utterances output by the ASR subsystem to corrected utterances.

19. The computer-program product of claim 18, the method further comprising including the correction model in the dialog system between the ASR subsystem and a semantic parser of the dialog system, the ASR subsystem configured to map speeches to utterances, and the semantic parser configured to map utterances to logical forms.

20. The computer-program product of claim 19, wherein:
- the first tuple of the training data further comprises a logical form corresponding to the utterance, wherein the logical form is a syntactic expression of the utterance according to an established grammar; and
- the method further comprises training the semantic parser based on the training data.

* * * * *

UNITED STATES PATENT AND TRADEMARK OFFICE
CERTIFICATE OF CORRECTION

PATENT NO. : 11,462,208 B2
APPLICATION NO. : 16/992291
DATED : October 4, 2022
INVENTOR(S) : Duong et al.

It is certified that error appears in the above-identified patent and that said Letters Patent is hereby corrected as shown below:

In the Specification

In Column 3, Line 30, delete "the an" and insert -- an --, therefor.

In Column 15, Line 16, delete "ITS" and insert -- TTS --, therefor.

In Column 20, Line 27, delete "AppleTalk," and insert -- AppleTalk®, --, therefor.

In Column 27, Line 2, delete "Sir" and insert -- Siri® --, therefor.

In the Claims

In Column 32, Line 22, in Claim 10, delete "the the" and insert -- the --, therefor.

In Column 34, Line 4, in Claim 18, delete "utterance the" and insert -- utterance and the --, therefor.

Signed and Sealed this
Twenty-first Day of March, 2023

Katherine Kelly Vidal
*Director of the United States Patent and Trademark Office*